(12) United States Patent
Luo

(10) Patent No.: US 8,885,182 B1
(45) Date of Patent: Nov. 11, 2014

(54) METHOD AND APPARATUS FOR DIRECTLY PRINTING A FILE BY PLACING THE FILE IN A FOLDER ASSOCIATED WITH A PRINTING DEVICE

(75) Inventor: Wen Luo, Shanghai (CN)

(73) Assignee: Marvell International Ltd., Hamilton (BM)

( * ) Notice: Subject to any disclaimer, the term of this patent is extended or adjusted under 35 U.S.C. 154(b) by 819 days.

(21) Appl. No.: 12/797,514

(22) Filed: Jun. 9, 2010

Related U.S. Application Data

(60) Provisional application No. 61/228,909, filed on Jul. 27, 2009.

(51) Int. Cl.
*G06K 5/00* (2006.01)
*H04N 1/40* (2006.01)

(52) U.S. Cl.
USPC .......................................... 358/1.13; 358/1.16

(58) Field of Classification Search
USPC .............. 358/1.1, 1.9, 1.14, 1.15, 1.16, 1.18, 358/1.13; 709/200
See application file for complete search history.

(56) References Cited

U.S. PATENT DOCUMENTS

| | | | | |
|---|---|---|---|---|
| 7,213,060 | B2 * | 5/2007 | Kemp et al | 709/222 |
| 7,295,336 | B2 * | 11/2007 | Yoshida et al. | 358/1.15 |
| 2007/0082613 | A1 * | 4/2007 | Cox | 455/41.2 |
| 2007/0168353 | A1 * | 7/2007 | Jang | 707/10 |
| 2008/0100869 | A1 * | 5/2008 | Nagai | 358/1.18 |

* cited by examiner

*Primary Examiner* — Gabriel Garcia

(57) ABSTRACT

Some of the embodiments of the present disclosure provide a method comprising simulating, on a display, a printing device as a mass storage drive, the mass storage drive being represented as a folder on the display; receiving user input placing a file into the folder representing the mass storage drive; and in response to the file being placed in the folder representing the mass storage device, printing contents of the file at the printing device. Other embodiments are also described and claimed.

8 Claims, 5 Drawing Sheets

METHOD AND APPARATUS FOR DIRECTLY PRINTING A FILE BY PLACING THE FILE IN A FOLDER ASSOCIATED WITH A PRINTING DEVICE

CROSS REFERENCE TO RELATED APPLICATIONS

The present application claims priority to U.S. Patent Application No. 61/228,909, filed Jul. 27, 2009, the entire specification of which is hereby incorporated by reference in its entirety for all purposes, except for those sections, if any, that are inconsistent with this specification.

TECHNICAL FIELD

Embodiments of the present invention relate to printing, and more specifically, to printing directly to a printing device.

BACKGROUND

The background description provided herein is for the purpose of generally presenting the context of the disclosure. Work of the presently named inventors, to the extent it is described in this background section, as well as aspects of the description that may not otherwise quality as prior art at the time of filing, are neither expressly nor impliedly admitted as prior art against the present disclosure.

To print a document (or a part of the document) from a computer to a printer, a user generally opens the document and selects a printing option from the file menu or from a print button. Accordingly, for printing the document, initially an application program associated with the document has to be loaded. Next the document has to be loaded and opened in the computer. Finally, the printing option has to be selected from the document. Loading the application program and opening the document can take a long time based on, for example, the type and complexity of the application program, size of the document, speed of the computer, and/or the like.

There can be circumstances where the user wants to print the document, but does not want to otherwise access the document (e.g., does not want to read or edit the document).

SUMMARY

In various embodiments, the present disclosure provides a method comprising simulating, on a display, a printing device as a mass storage drive, the mass storage drive being represented as a folder on the display; receiving user input placing a file into the folder representing the mass storage drive; and in response to the file being placed in the folder representing the mass storage device, printing contents of the file at the printing device.

BRIEF DESCRIPTION OF THE DRAWINGS

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 1:
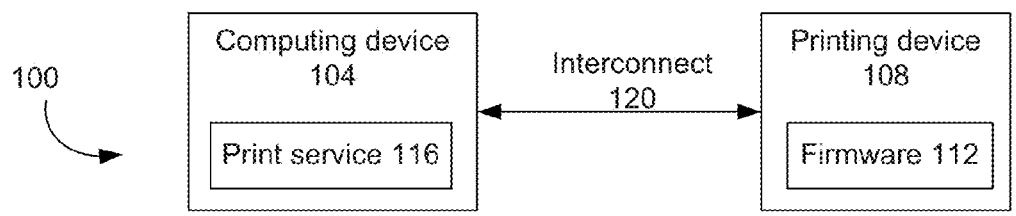
FIG. 1 schematically illustrates a system that includes a computing device and a printing device, in accordance with various embodiments of the present disclosure.

FIG. 1 schematically illustrates a system 100 that includes a computing device 104 and a printing device 108. The computing device 104 is, for example, a personal computer, a laptop, a cellular phone, a mobile device, and/or any other electronic device that is capable of printing one or more documents to the printing device 108. The computing device 104 is operatively coupled to the printing device 108 through interconnect 120. The interconnect 120 is any appropriate type of connection, e.g., a Universal Serial Port (USB) connection, an Ethernet connection, a serial port connection, a parallel port connection, a wireless connection, a network connection, or the like. The printing device 108 is any appropriate device (e.g., a monochrome printer, a color printer, and/or the like) that is configured to print one or more documents from the computing device 104.

In order for the computing device 104 to fully utilize the functionalities of the printing device 18, an appropriate driver software generally needs to be loaded, installed, and configured in the computing device 104. For example, a printer driver of appropriate type generally needs to be loaded, installed and configured in the computing device 104 to enable the computing device 104 to access and print at the printing device 108. While installing the printer driver in the computing device 104, a print service 116 is installed in the computing device 104, as will be discussed in more detail herein later.

The printing device 108 generally includes firmware 112, which is configured to simulate the printing device 108 as a mass storage drive to the computing device 104. That is, the printing device 108 appears as a mass storage drive to the computing device 104 and/or to a user of the computing device 104. In various embodiments, such configuration of the firmware 112 is carried out during or subsequent to installing the printer driver, and/or while the printing device 108 is connected to the computing device 104 through the interconnect 120.

Figure 2:
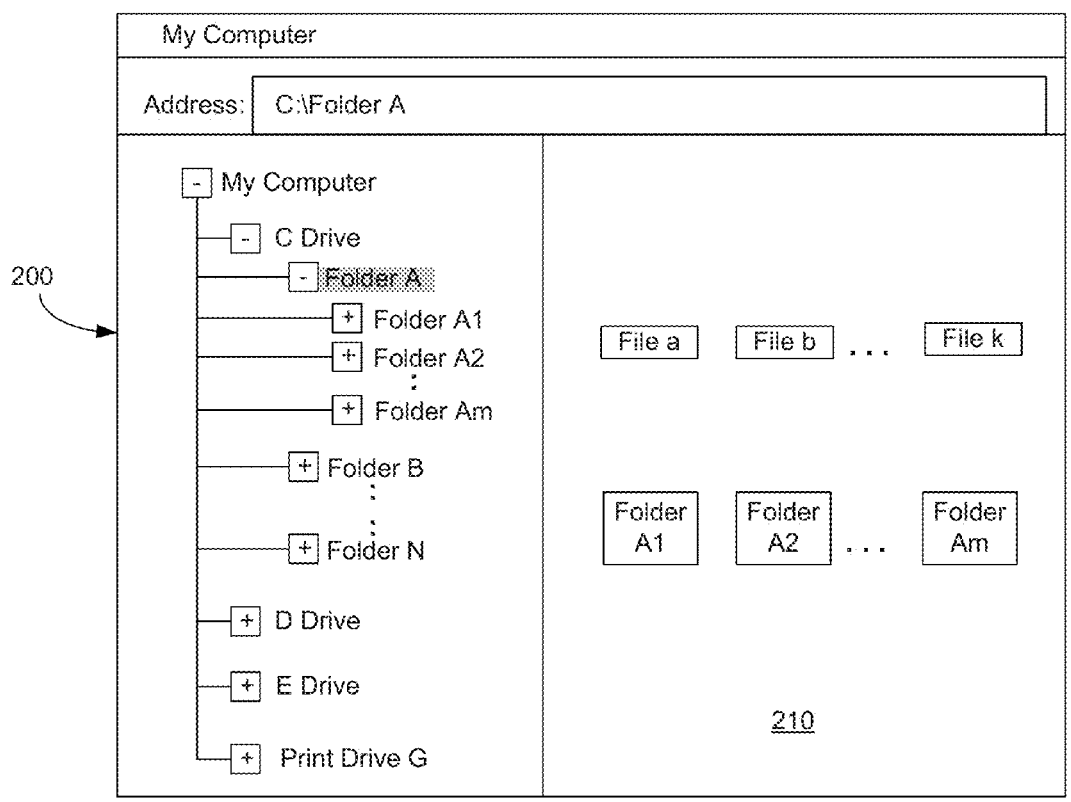
FIG. 2 schematically illustrates a file explorer illustrating various files and folders the computing device of FIG. 1, in accordance with various embodiments of the present disclosure.

FIG. 2 schematically illustrates a file explorer 200 illustrating various files and folders of the computing device 104 of FIG. 1, in accordance with various embodiments of the present disclosure. For example, in a case where the computing device 104 operates on a Windows® operating system (e.g., Windows XP®, Windows 2000®, and/or any other versions of the Windows® operating system), the file explorer 200 can be opened by a right click of a mouse on the start menu of the computing device 104, and selecting an explore option. As illustrated in the file explorer 200, the computing device 104 includes various drives (e.g., a C drive, a D drive, and an E drive). Furthermore, the previously discussed mass storage drive of the printing device 108 is illustrated as Print Drive G in the file explorer 200. Thus, the printing device 108 is simulated as Print Drive G on a display of the computing device 104. The Print Drive G is represented as a folder on the display. In various embodiments, the firmware 112 facilitates the simulation of the printing device 108 as the Print Drive G in the computing device 104.

The file explorer 200 also illustrates a folder and file hierarchy of the computing device 104. For example, as illustrated in FIG. 2, the C drive of the computing device 104 has Folder A, Folder B, . . . , Folder N. Also, Folder A has Folder A1, Folder A2, . . . , Folder Am and File a, File b, . . . , File k. The Folder A is highlighted in FIG. 2, as all the files and folders included in Folder A are illustrated in a right section 210 of the file explorer 200.

The print service 116 installed in the computing device 104 is configured to monitor any file that is copied or moved to the Print Drive G. For example, in the case where the computing device 104 operates on a Windows® operating system, the print service 104 is a Dynamic-link library (DLL) that is configured to monitor any file that is copied or moved to the Print Drive G.

In various embodiments, the print service 116 is hooked or coupled to a file explorer function of the computing device. Each time a user of the computing device 104 places a file into the folder representing the Print Drive G, the print service 116 determines that the file has been placed into the Print Drive G. The user places the file into the folder representing the Print Drive G by moving or copying the file to folder (e.g., by dragging and dropping an icon of the file to the folder, copying and pasting the file to the folder, cutting and pasting the file to the folder, or moving or copying the file to the folder by any other appropriate means). In various embodiments, the print service 116 receives information regarding such placing of the file from, for example, the file explorer function. The print service 116 also receives the file name, location, and/or other relevant information from the file explorer function.

Based on determining that the file has been placed into the folder representing the Print Drive G, the print service 116 calls or executes an appropriate function (e.g., a ShellExecute function) to print the contents of the file to the printing device 108.

In various embodiments, a default print option and a default print flag is associated with the printing device 108. The default print option and the default print flag are set or configured using, for example, a properties dialog box associated with the printing device 108, the print service 116 and/or the Print Drive G.

The default print option defines various default printing options (e.g., single sided or double sided printing, portrait/landscape layout, paper size, etc.) associated with the printing device 104.

The default print flag determines whether, while the print service 116 prints contents of a file to the printing device 104, the printing is performed using the default print option. For example, in the case where the default print flag is turned on, the contents of the file are printed directly at the printing device 104 (e.g., in response to the user of the computing device 104 copying or moving the file to the Print Drive G) using the default print setting, without allowing any change in the print setting before printing. On the other hand, in the case where the default print flag is turned off, a print setting dialog box is opened to allow the user to select or change one or more print settings, prior to printing the contents of the file.

Figure 3:
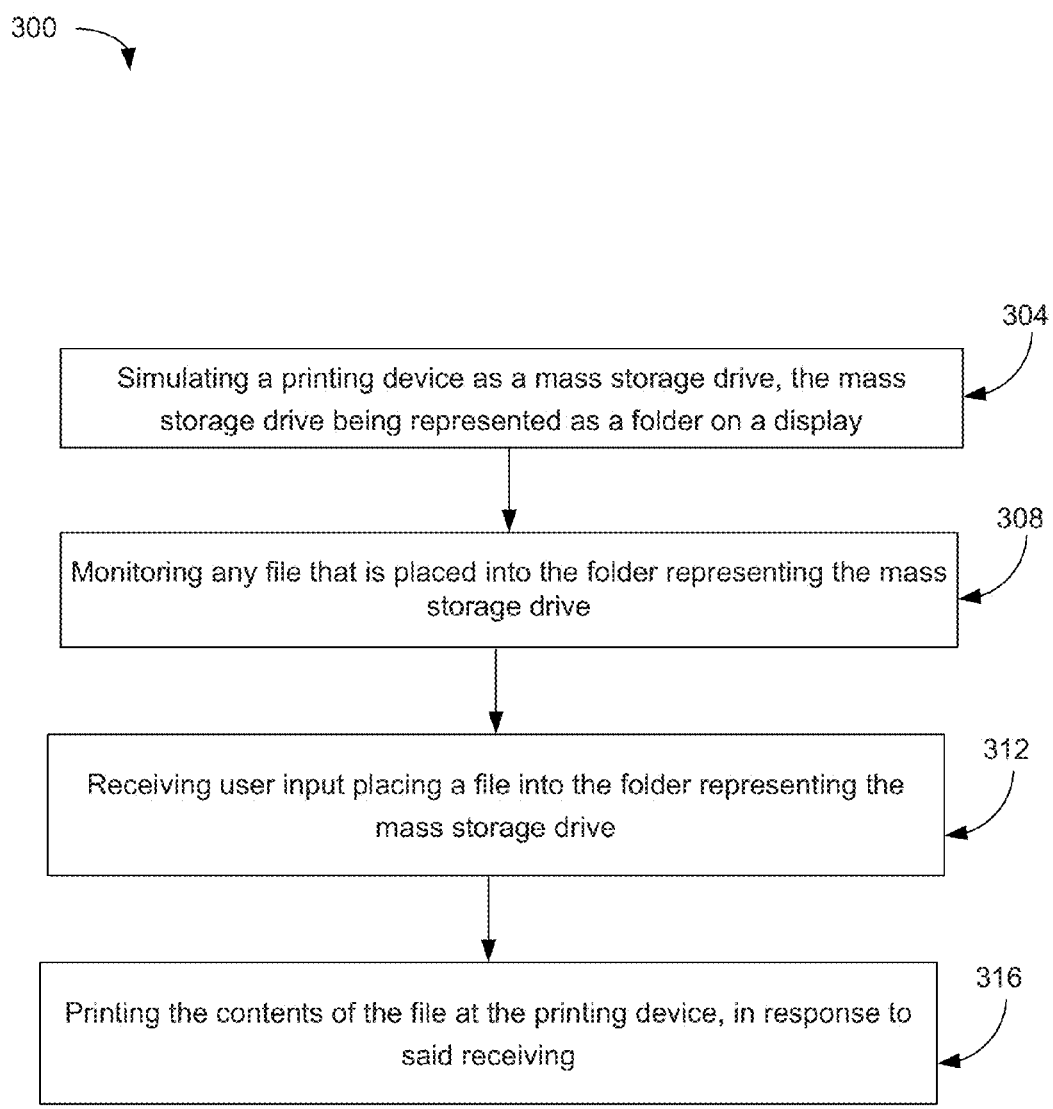
FIG. 3 illustrates an example method for printing in the printing device 108 using the Print Drive G, in accordance with various embodiments of the present disclosure.

FIG. 3 illustrates an example method 300 for printing in the printing device 108 using the Print Drive G, in accordance with various embodiments of the present disclosure. Referring to FIGS. 1-3, the method 300 includes, at 304, simulating, in a computing device (e.g., on a display of the computing device 104) a printing device (e.g., printing device 108) as a mass storage drive (e.g., Printer Drive G). In various embodiments, the firmware 112 included in the printing device 104 facilitates such simulation. In various embodiments, the mass storage drive is represented as a folder on the display of the computing device.

At 308, the print service 116 monitors any file that is placed in (e.g., copied or moved to) the folder representing the mass storage drive. For example, the print service 116 receives, from the file explorer function, a notification if a file is placed in (e.g., copied or moved to) the folder representing the mass storage drive. In various embodiments, the notification includes a name, location, and/or other relevant information about the file.

At 312, the print service 116 receives user input placing a file into the folder representing the mass storage drive. For example, the print service 116 receives the notification regarding placement of the file into the folder representing the mass storage drive.

At 316, the print service 116 prints the contents of the file at the printing device 108, in response to the receiving at 312. For example, the print service 116 calls or executes an appropriate function (e.g., ShellExecute function) to print the contents of the file to the printing device 108.

Figure 4:
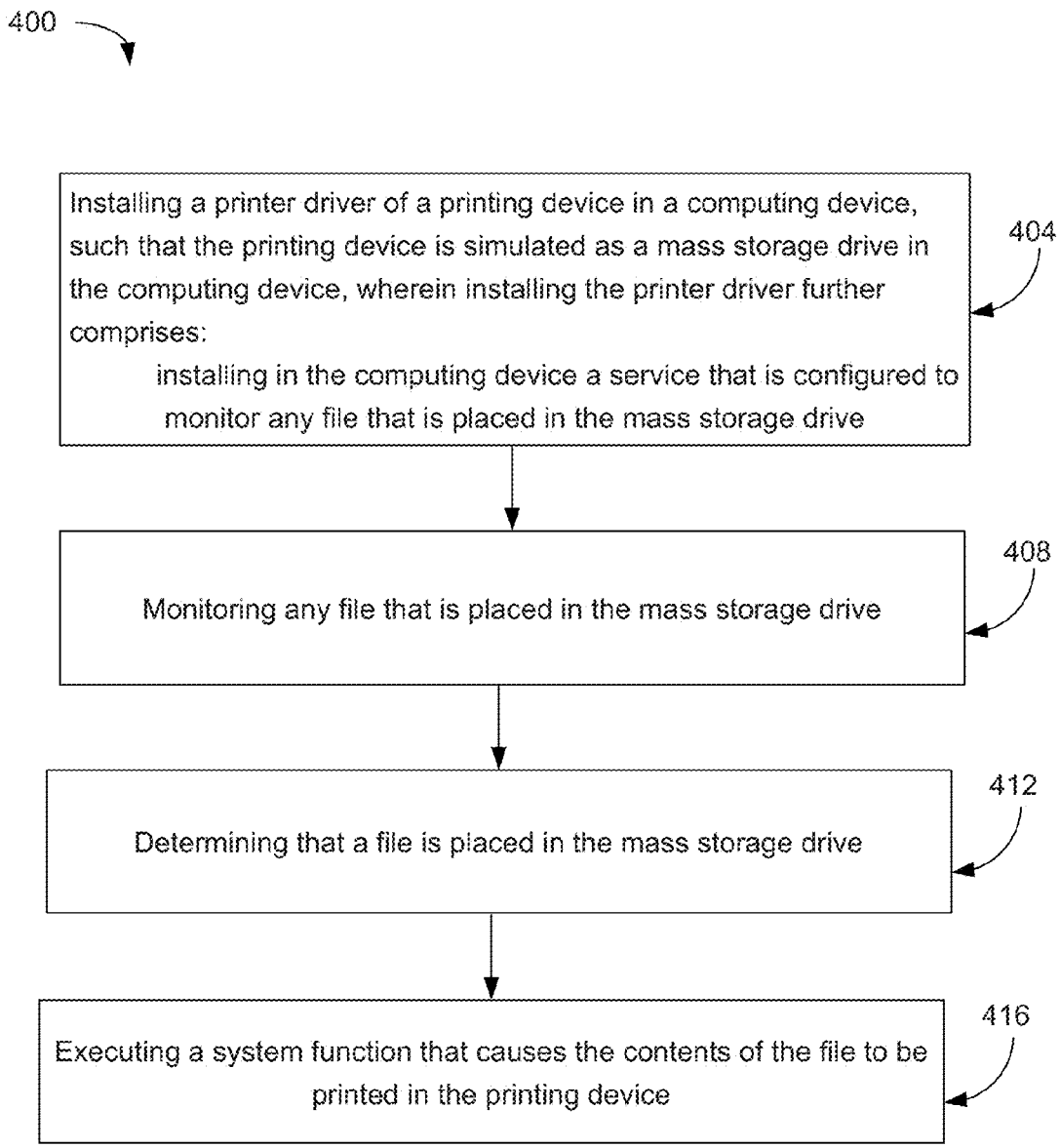
FIG. 4 illustrates another example method for printing in the printing device using a Print Drive G, in accordance with various embodiments of the present disclosure.

FIG. 4 illustrates another example method 400 for printing at the printing device 108 using the Print Drive G, in accordance with various embodiments of the present disclosure. Referring to FIGS. 1-2 and 4, the method 400 includes, at 404, installing a printer driver of the printing device 108 in the computing device 104, such that the printing device 108 is simulated as a mass storage drive (e.g., Print Drive G) in the computing device 108. For example, the mass storage drive may be represented as a folder in a display of the computing device 108. Installing the printer driver further comprises installing in the computing device 108 the print service 116 that is configured to monitor any file that is placed in (e.g., copied or moved to) the mass storage drive. For example, the print service 116 is configured to monitor any file that is placed in the folder that represents the mass storage drive.

At 408, the print service 116 monitors any file that is placed in the mass storage drive.

At 412, the print service 116 determines that a file is placed in the mass storage drive. For example, from the file explorer 200 a user of the computing device 104 can drag and drop an icon of the file to a folder representing the mass storage device using, for example, a mouse. The user can also otherwise move or copy (e.g., using copy and paste function, cut or paste function, or the like) the file to the folder that represents the mass storage drive.

At 416, the print service 116 executes a system function that causes the contents of the file to be printed at the printing device 108. In the case where a default print flag is turned on, the contents of the file is printed at the printing device 108 using a default print setting without allowing any change in the print setting. In the case where the default print flag is turned off, prior to printing the contents of the file, a print setting dialog box is opened to allow one or more changes in the print setting.

Although in the above discussions only one file is copied or moved to the Print Drive G for printing, in various embodiments, the inventive principles of this disclosure are also equally applicable to multiple (i.e., more than one) files. For example, in various embodiments, multiple files are simultaneously copied or moved to the Print Driver G (e.g., by selecting multiple files in the file explorer 200, and dragging and dropping the selected multiple files to the Print Driver G). In such a case, the print service 116 determines that the multiple files have been copied or moved to the mass storage drive (e.g., based on notification received from the file explorer function). Based on this determination, the print service 116 causes the contents of the multiple files to be printed at the printing device 108. For example, the print service 116 calls or executes an appropriate function (e.g., ShellExecute function) to print the contents of the multiple files to the printing device 108.

Directly printing contents of one or more files, by copying or moving the one or more files to the Print Drive G, has several advantages. For example, in such direct printing, a user does not have to open the one or more files, resulting in a saving of time and hassle for the user.

Figure 5:
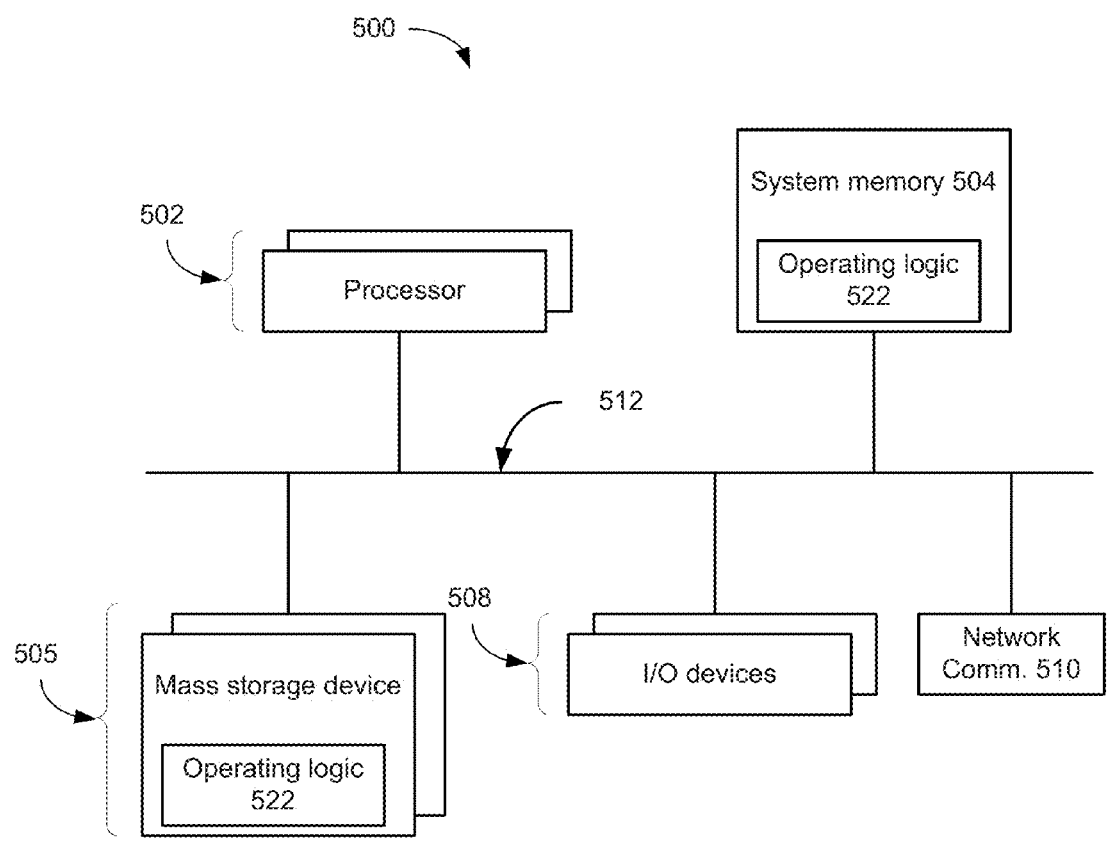
FIG. 5 is a block diagram of an illustrative system suitable for practicing the embodiments of the present disclosure.

FIG. 5 is a block diagram of an illustrative system 500 suitable for practicing the embodiments of the present disclosure. As illustrated, system 500 includes one or more processors or processor cores 502, and system memory 504. For purposes of this disclosure, including the claims, the terms "processor" and "processor cores" may be considered synonymous, unless the context clearly requires otherwise. Additionally, system 500 includes mass storage devices 506 (such as diskette, hard drive, compact disc read only memory (CDROM) and so forth), input/output devices 508 (such as a display to render visual manifestation, a keyboard, a cursor control, and so forth) and communication interfaces 510 (such as network interface cards, modems and so forth). The elements of FIG. 5 may be coupled to each other via system bus 512, which represents one or more buses. In the case of multiple buses, they may be bridged by one or more bus bridges (not illustrated).

System memory 504 and mass storage 506 may be employed to store a working copy and a permanent copy of the programming instructions implementing all or a portion of earlier described functions, herein collectively denoted as 522. The instructions 522 may be assembler instructions supported by processor(s) 502 or instructions that can be compiled from high level languages, such as C or other suitable high level programming languages.

A permanent copy of the programming instructions is stored into permanent storage 506 in the factory, or in the field, through, for example, a distribution medium (not shown), such as a compact disc (CD), or through communication interface 510 (from a distribution server (not shown)). That is, one or more distribution media having instructions 522 may be employed to distribute the instructions 522 and program various computing devices.

In various embodiments, the system 500 acts as the computing device 104 of FIG. 1. Thus, the system 500 is operatively coupled to a printing device (e.g., printing device 108) using an interconnect (e.g., interconnect 120).

In various embodiments, the printer driver of the printing device 108, along with the print service 116, is installed in the system 500. For example, one or more instructions associated with the printer driver and/or the print service 116 are stored as instructions 522. In various embodiments, the system 500 (e.g., the processor 502) is configured to execute one or more instructions to cause the system 500 to execute one or more operations of methods 300 and 400 of FIGS. 3 and 4, respectively (and/or one or more operations associated with printing, as discussed in this disclosure).

In embodiments of the present disclosure, an article of manufacture (not illustrated) implements one or more methods as disclosed herein. For example, in various embodiments, an article of manufacture may comprise a storage medium and a plurality of programming instructions stored in the storage medium and adapted to program a computing device to configure the computing device to execute one or more operations associated with printing one or more files to the printing device 108 (e.g., one or more operations of methods 300 and 400 of FIGS. 3 and 4, and/or one or more operations associated with printing, as discussed in this disclosure).

Although specific embodiments have been illustrated and described herein, a wide variety of alternate and/or equivalent implementations may be substituted for the specific embodiment illustrated and described without departing from the scope of the present disclosure. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein.

What is claimed is:

1. A method comprising:
    installing a printer driver of a printing device in a computing device such that the printing device is being simulated as a mass storage in the computing device, wherein installing the driver of the printing device in the computer device further comprises installing in the computing device a print service that is configured to monitor any file that is placed in the mass storage drive;
    simulating, on a display of the computing device, the printing device as the mass storage drive, wherein the mass storage drive is simulated as a separate drive of the computing device, and wherein simulating the printing device as the mass storage drive comprises displaying folder on the display, wherein the folder represents the printing device as the mass storage that is different from one or more other drives of the computing device;

receiving user input placing a file into the folder representing the mass storage drive; and in response to the file being placed in the folder representing the mass storage device, printing contents of the file at the printing device.

2. The method of claim 1, wherein the contents are printed using a default print setting without allowing any change in the print setting.

3. The method of claim 1, further comprising:

prior to printing of the contents, opening a print setting dialog box to allow one or more changes in a print setting.

4. The method of claim 1, wherein receiving the user input further comprises:

receiving, by a print service, a notification that the file is copied or moved into the folder representing the mass storage device.

5. The method of claim 4, wherein receiving the notification further comprises:

receiving, from a file explorer function, the notification that includes a name and a location of the file.

6. The method of claim 1, wherein receiving the user input further comprises:

determining that the file is copied or moved into the folder representing the mass storage drive in response to a user of the computing device (1) dragging and dropping an icon of the file into the folder, (2) copying and pasting the file into the folder, or (3) cutting and pasting the file into the folder.

7. The method of claim 1, wherein receiving the user input further comprises: receiving, by the print service, a notification from a file explorer function, wherein the notification from the file explorer function indicates that the file is copied or moved into the folder representing the mass storage drive.

8. The method of claim 1, wherein printing contents of the file at the printing device further comprises:

transmitting a print request from the computing device to the printing device, to print the contents of the file at the printing device.

* * * * *